United States Patent [19]

Cake et al.

[11] 4,425,495
[45] Jan. 10, 1984

[54] IGNITOR AND ENCLOSURE STRUCTURE

[75] Inventors: Marcus P. Cake; Harry W. Falter, both of Rocky Mount; Clement W. Batchelor, Spring Hope; Michael A. Guarini, Rocky Mount, all of N.C.

[73] Assignee: Morrison-Knudsen Company, Inc., Boise, Id.

[21] Appl. No.: 448,816

[22] Filed: Dec. 10, 1982

[51] Int. Cl.³ .............................................. F23Q 7/22
[52] U.S. Cl. .............................. 219/267; 123/145 A; 219/268; 361/264; 431/262
[58] Field of Search .............. 219/260, 262, 267, 268, 219/270; 123/145 R, 145 A; 431/262; 361/264, 265, 266

[56] References Cited

U.S. PATENT DOCUMENTS

| 2,198,850 | 4/1940 | White | 123/145 A |
| 2,506,768 | 5/1950 | Bentz et al. | 219/267 X |
| 2,967,224 | 1/1961 | Irwin | 361/266 |
| 3,412,290 | 11/1968 | Hempson | 219/262 X |
| 3,744,955 | 7/1973 | Tyler et al. | 361/265 |
| 4,206,492 | 6/1980 | Rhodes et al. | 361/264 |
| 4,237,843 | 12/1980 | Page et al. | 123/145 A |
| 4,356,380 | 10/1982 | Kao | 219/262 |

Primary Examiner—Volodymyr Y. Mayewsky
Attorney, Agent, or Firm—Raymond N. Baker

[57] ABSTRACT

Hydrogen ignitor and housing structure having high-strength and lightweight characteristics for surface mounting within a nuclear reactor containment vessel are disclosed. A unitary main body is formed from stainless steel sheet metal free of internal or external structural bracing to provide an open-ended enclosure for placement and interconnection of electrical transformer equipment for the hydrogen ignitor. The open end of the main body enclosure is hermetically sealed with a unitary stainless steel sheet metal cover plate which interlocks with the main body sidewall so that forces, due e.g. to changes of pressure, tending to distort the configuration of the sidewall or cover plate, are absorbed by both through such interlocking. Hermetic sealing of the enclosure is maintained while providing limited access for external placement of an ignitor glow probe and for line voltage power supply internally of the enclosure. A single opening in the cover plate for a glow plug having an ignitor glow probe is sealed by coaction between portions of a glow plug housing and a glow plug structure which provide coacting metal-to-metal sealing surfaces. A single opening in the sidewall provides for access of line voltage electrical conductors through a conduit which is sealed to the sidewall about its external surface and is sealed along its interior by a metal disk joined to the conduit internally of the enclosure and by hardenable sealant occupying the interior of the conduit. An aperture in the metal disk permits entry of electrical conductors with change of pressure forces at any remaining area of such aperture being distributed over the larger transverse area of the conduit occupied by sealant.

6 Claims, 11 Drawing Figures

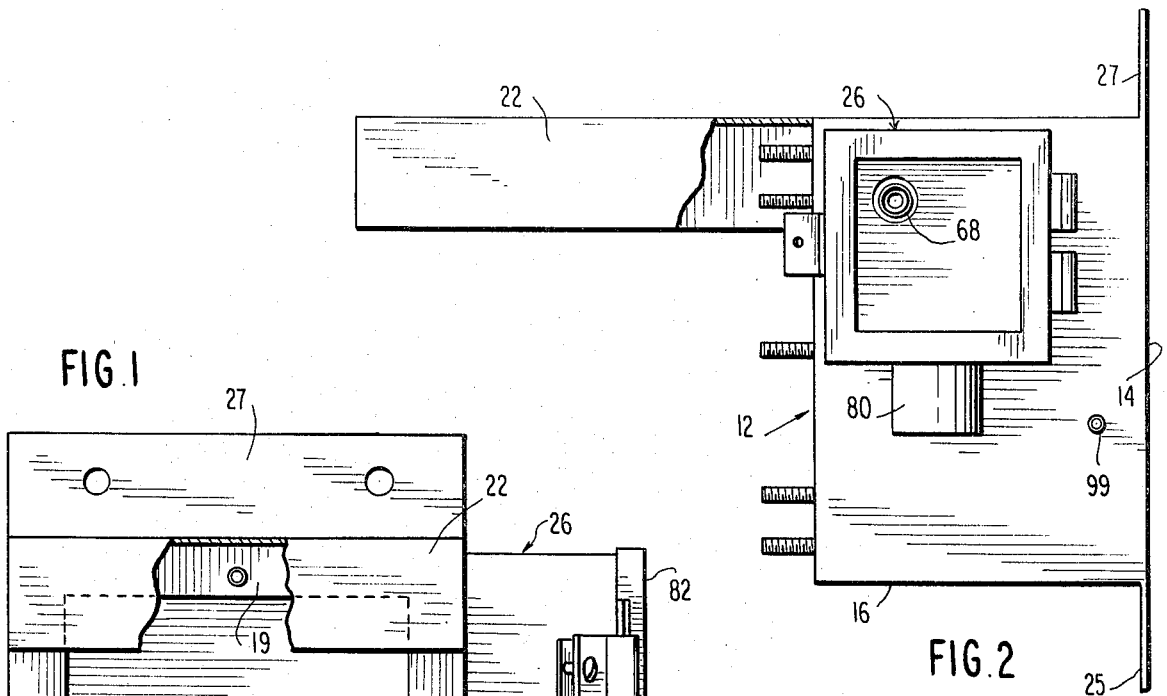
FIG. 1
FIG. 2
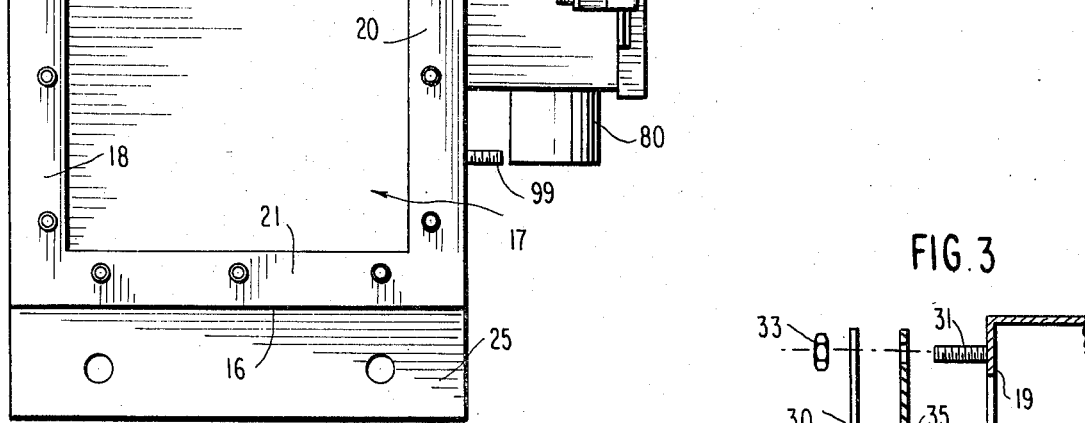
FIG. 3
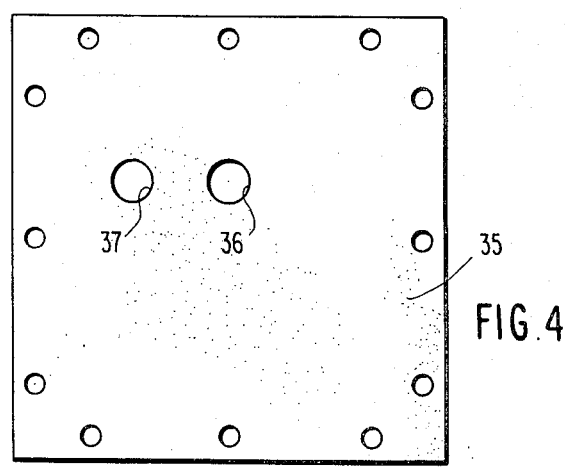
FIG. 4

IGNITOR AND ENCLOSURE STRUCTURE

This invention is concerned with a hydrogen ignitor and protective enclosure to ensure dependable operation under adverse envoirnmental conditions of pressure, temperature, nuclear radiation and moisture such as would be encountered within the containment structure for a nuclear reactor in the event of an accident.

A specific embodiment of the invention provides for dependable, controlled, and uniform ignition of leakage gases, such as hydrogen, within a nuclear containment structure to prevent hazardous accumulation of explosive gases. This safety feature is an addition to established nuclear reactor structures and can require a plurality of individual ignitor devices distributed over the interior surface of the containment structure. Therefore, in order to provide the number of devices required for uniformly controlled ignition, the structure must also have lightweight characteristics to enable surface mounting free of columnar support.

The present invention provides lightweight and high strength enclosure characteristics while providing for suitable preassembly access to the enclosure for installation of electrical transformer circuit elements and connection thereof. The invention provides for reliability over extended periods of time, measured in terms of decades, with the capability of withstanding forces tending to distort the configuration of the enclosure.

Contributions of the invention are considered in more detail in describing a specific embodiment of the invention as shown in the accompanying drawings. In these drawings:

FIG. 1 is a front elevational view, with a portion cut away, of structure forming part of the invention;

FIG. 2 is a side elevational view, with a portion cut away, of the structure of FIG. 1;

FIG. 3 is an assembly cross-sectional view including a portion of the structure of FIG. 1, an access cover plate, gasket, and fastening means;

FIG. 4 is a front elevational view of a cover plate gasket of the present invention;

Figure 6:
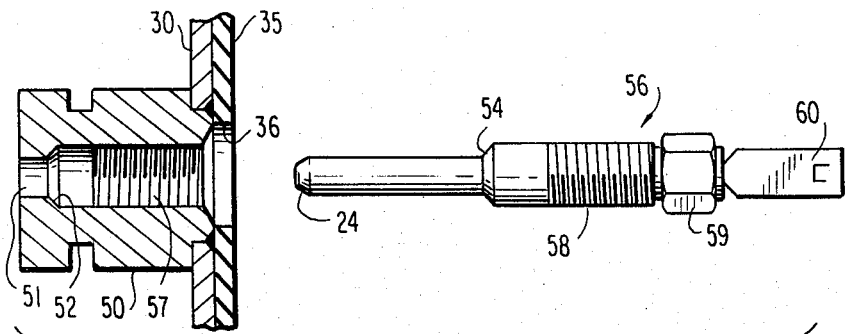
FIG. 6 is an assembly view, partially in cross section, of ignitor glow plug structure and mounting means.

Referring in particular to FIGS. 1 and 2, the specific embodiment provides a unitary body 12, formed from stainless steel sheet metal, which includes back wall 14 and sidewall means 16 which extend from the back wall 14 defining an enclosure with a single open end. Sealable access 17 is defined by flanges 18, 19, 20, and 21 which are angled inwardly of the open-ended enclosure from the side-wall means 16. Flange 19 is seen in FIG. 1 where a portion of spray hood 22 has been cut away. Spray hood 22 is secured to main body 12 and extends in a forward direction to protect, in assembled form, ignition probe 24 (FIG. 3) from falling liquid spray.

The main body 12 defined by back wall 14, side-wall means 16, and flanges 18–21 is unitary and free of internal and external bracing or structural strengthening members which would detract from the lightweight characteristics desired. Suitable preassembly access for internal placment, mounting and interconnection of electrical circuit elements is provided, with access cover provisions additionally providing for strengthening of the enclosure and hermetic sealing.

Spray hood 22, electrical terminal box 26, and flanges 27, 28 for wall surface mounting of the structure are made unitary with the main body by welding of such stainless steel sheet metal elements to the main body. Back flanges 27, 28 include apertures enabling surface mounting on a containment wall using shallow-depth wall fasteners without compromising the integrity of the containment surface.

The desired high strength characteristic and structural integrity are achieved using sheet metal construction, free of internal and external bracing or structural members, by integrating the main body 12 with a closure at the open end of the main body. Referring to FIG. 3, unitary cover plate 30 comprises stainless steel sheet metal of a gage substantially corresponding to that of the sheet metal of main body 12. In order to provide foolproof, gas-tight, hermetic sealing of access opening 17 and to provide desired interlocking of main body 12 and cover plate 30, studs such as 31, 32 are welded in perpendicular relationship to external surfaces of flanges 18–21. Such studs are predeterminedly distributed about the access perimeter defined by such flanges to provide for uniformity in interlocking with the main body.

No apertures are formed in the flanges for purposes of mounting the studs; for example, structural integrity and gas-tight characteristics of the flanges are maintained by welding the studs to the external flange surfaces free of penetration through the flanges, Preferably, such studs are solid so as to prevent any possibility of gas access along their longitudinal axes and are of circular cross-sectional configuration. Means are provided at least at distal ends of the studs for the receiving fastening means and movement thereof longitudinally of the studs. For example, threads along the external surface of the studs provide for longitudinal movement of internally threaded nuts such as 33, 34.

Gasket 35 has preselected characteristics for hermetic sealing and long life purposes, and is positioned between cover plate 30 and flanges 18–21 for assembly as shown in FIG. 3. Gasket 35 which is coextensive dimensionally with flanges 18–21 extends over the full area defined by sidewall means 16 conforming to the configuration presented; e.g., square in the embodiment shown. Peripherally distributed apertures in gasket 35 conform in number, location and cross-sectional configuration to flange studs, such as 31, 32. Glow plug opening 36 (FIGS. 3 and 4), and a ground connector aperture 37 are centrally located.

Ground connection needs are met by internal surface mounting on cover plate 30 so that apertures in cover plate 30, which is substantially coextensive dimensionally with gasket 35, are limited to the peripheral stud openings and the glow plug opening. Such cover plate apertures correspond to the openings for the same purposes shown in the gasket as presented in FIG. 4. Such peripheral apertures in the cover plate conform to the transverse cross-sectional configuration of the studs, with only nominal clearance being provided for purposes of assembly; such feature provides a tight fitting relationship for each stud and provides an interlocking of the cover plate 30 and main body 12 so that forces tending to distort either are jointly absorbed.

Figure 5:
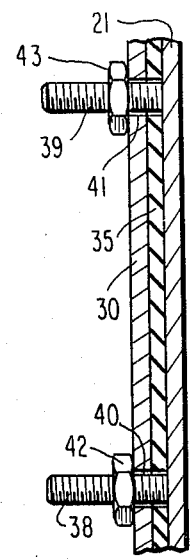
FIG. 5 is an enlarged cross-sectional partial view, with portions shown in elevation, showing access cover plate sealing provisions of the present invention.

In the enlarged detail view of FIG. 5, portions of a flange, gasket, and cover plate are shown in assembled cross-sectional view while the fasteners are shown in elevation. A portion of a flange, such as 21, includes studs 38, 39 which are welded to its external surface. Gasket 35 and cover plate 30 are in overlaying relation to the flange means with a stud passing through each aperture located contiguous to the periphery of the cover plate. As shown, studs 38, 39 fit through apertures 40, 41 respectively; such apertures establish a predetermined tolerance interfitting relationship, allowing nominal clearance for assembly purposes, with the studs. Fasteners 42, 43 are threaded onto studs 38, 39, respectively, and are tightened to provide a gas-tight seal about such access opening between the cover plate and the flanges of the unitary body.

Stud locations are distributed about the flanges which define the access opening 17, in a manner indicated by the stud locations in gasket 35 of FIG. 4, to provide for uniformity in sealing force distribution as well as uniformity in the distribution of forces tending to distort either the cover plate or sidewall means. The entire enclosure is free of internal and external bracing while being able to withstand rapidly changing wide pressure swings either above or below atmospheric level; this capability is provided notwithstanding an access opening, approaching the full dimensional scale of the main body at its open end to provide for placement of transformers and other electrical circuit elements required and for manual interconnecting of such elements.

An important contribution of the invention involves the use of the studs and cover plate to help maintain the required structural integrity notwithstanding forces, e.g., due to explosion or implosion, tending to cause configurational distortion; the interlocking of the parts results in joint absorption of configuration distorting forces so as to prevent compromise of the enclosure. With the interlocking relationship provided, cover plate 30 acts as a column, or as a tension member, to absorb pressure forces acting on the sidewall means; such forces are transferred to the cover plate through the flange studs. Also forces tending to distort the cover plate are absorbed by the sidewall means through the flange studs. Because of these provisions, the frontal portion of the enclosure has substantially the same strength characteristics as the rear wall. The cover plate 30, although made integral, results in hermetic sealing and structural features comparable to those of a unitary enclosure.

The teachings of the invention also provide for external disposition of an ignitor glow probe and for supplying line voltage internally of the enclosure while maintaining hermetic sealing characteristics of the enclosure; openings into the enclosure are limited in accordance with these teachings.

Figure 7:
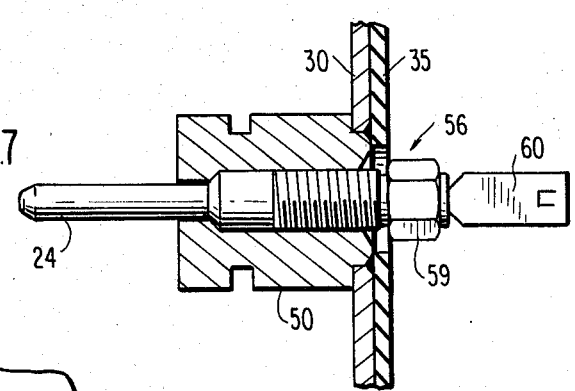
FIG. 7 is an assembled view of the structure of FIG. 6.

Unique mounting features which provide for gas-tight sealing and for external disposition of a glow plug probe are shown in FIG. 6, before assembly, and FIG. 7, after assembly.

Figure 8:
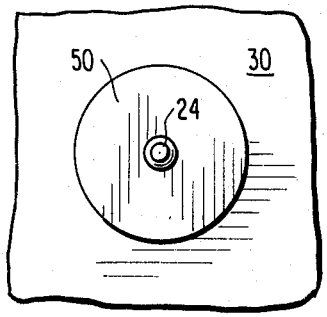
FIG. 8 is a front elevational view of the structure of FIG. 7.

Glow plug mounting housing 50 preferably has a cylindrical configuration as best seen in the front elevational view of FIG. 8. The housing 50 is made unitary with the cover plate, e.g. by welding about its full cylindrical periphery to cover plate 30, in circumscribing relationship to glow plug opening 36.

Mounting housing 50 includes probe opening 51, of a diameter corresponding to the diameter of probe 24, and is internally machined to provide beveled sealing surface 52 as part of the female structure for receiving a male plug. Beveled surface 52 mates with beveled surface 54 of elongated glow plug structure 56. Mounting 50 is provided with internal threads 57 for receiving and coacting with threads 58 on the male plug. Plug 56 is interfitted as shown in FIG. 7 with rotational force being applied through hexagonal end 59 for establishing a gas-tight, metal-to-metal seal between beveled surfaces 52 and 54; this provides hermetic sealing of aperture 36. Electrical energy is thus supplied to external electrode 24 through connector tab 60 within the enclosure without sacrifice of structural strength or hermetic sealing characteristics.

Figure 9:
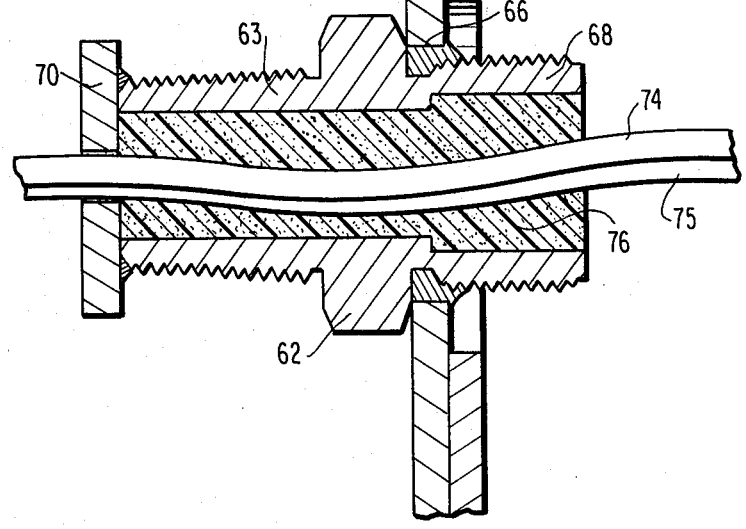
FIG. 9 is an enlarged detailed view, partially in cross section, of line voltage access means for use in the present invention.
Figure 10:
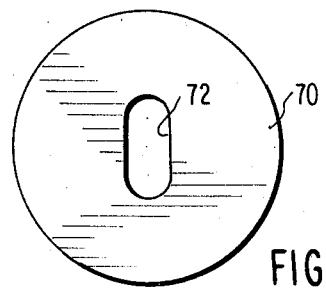
FIG. 10 is a view in elevation of a retainer disk used in the structure of FIG. 9.

Access internally of the enclosure for line voltage available at terminal box 26 is provided through a sidewall while maintaining structural and hermetic sealing characteristics of the enclosure. Referring to FIGS. 9 and 10, collar 62 is provided on internal conduit portion 63; such collar can be unitary with or threaded along and sealed to internal conduit portion 63 by welding around the periphery of such conduit. Collar 62 is welded to the internal surface of sidewall 16 in circumscribing relationship to sidewall aperture 66. External conduit portion 68 is coextensive, preferably unitary, with internal conduit 63 so that the entire conduit is gas-tight along its hollow tubular passageway as well as being gas-tight in relation to the enclosure about its external periphery due to welding of collar 62 to sidewall 16.

Retainer disk 70 with wire aperture 72, as shown in FIG. 10, is welded about its full periphery to the distal end of internal conduit 63. Line-voltage electrical conductors 74, 75 are fed through the access conduit with off-center disposition of the wires, as shown, during such passage providing added length referred to as a service loop of the conductors within the conduit. This provides sufficient length to provide for electrical integrity in the event of configurational distortion; also the off-center disposition of the conductors facilitates sealing.

Sealant 76 of selected hardening and durability properties fills both the internal conduit portion 63 and external conduit portion 68. Disk 70, in transverse relationship to such conduit passage, absorbs the bulk of longitudinally directed forces, e.g. due to pressure, in either longitudinal direction. Only a small assembly clearance area remains about conductors 74, 75 in opening 72 through which pressure can be exerted; pressure applied to such small area is distributed over the full transverse cross section of the sealant which extends throughout the length of the internal portion 63 and external portion 68 of the hollow tubular configuration; such distribution of forces is facilitated by the off-center disposition of the conductors within the conduit. Pressure forces, e.g. are substantially carried by metal structures while providing a ready access for line voltage conductors through a small opening with a clearance which is readily sealed to provide and maintain hermetic sealing of the enclosure.

Terminal box 26 is welded to sidewall 16 in surrounding relation to conduit portion 68. Access to terminal box 26 for purposes of connecting electrical conductors 74, 75 to line voltage, supplied through coupler 80, is provided by removable end wall 82. Such end wall is clamped, with covering gasket, to the remainder of terminal box 26 so that terminal box 26 is substantially waterproof, but can be be subject at least in part to changes in atmospheric pressure through coupler 80.

Electrical transformer and juncture terminal elements are secured, e.g. by surface welding, to an internal surface of main body 12 so as not to interfere with the structural or hermetic sealing integrity of the enclosure. The described frontal access to the enclosure is sufficient for placement of a wound transformer and electrical interconnection while maintaining such structural and hermetic sealing integrity.

Glow plugs generally rely on a lower voltage level than line voltage. Transformer materials are selected to provide desired temperature stabilized output through the range of temperatures likely to be encountered in a loss of cooling water accident. Known techniques for stepping down the line voltage can be used to provide for selection from multiple voltage levels; such electrical equipment is preferably mounted on the internal surface of back wall 14.

Figure 11:
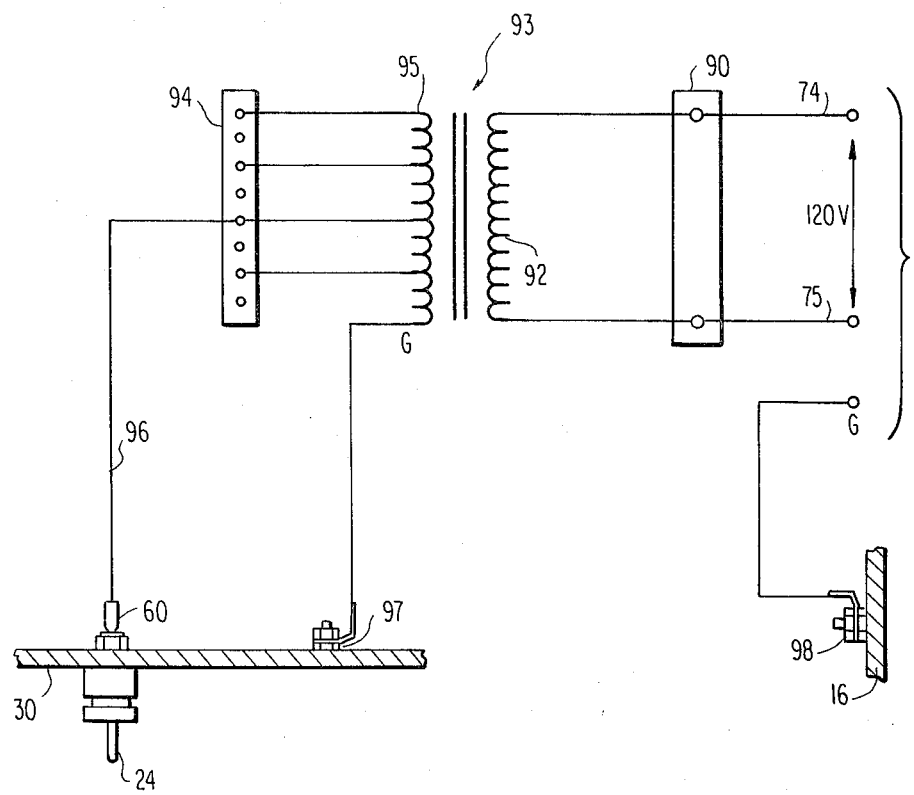
FIG. 11 is a schematic of circuit means for use in the present invention.

In the circuit schematic of FIG. 11, line voltage electrical conductors 74, 75 are connected to internally mounted juncture terminal 90 and supply line voltage to primary winding 92 of transformer 93. Juncture terminal 94 permits selection of various voltage levels from secondary windings 95 of transformer 93. Current at the selected voltage level in line 96 supplies electrode 24 through connector tab 60. Ground connector means 97, 98 are surface mounted internally of cover plate 35 and sidewall 16, respectively. Post 99 (FIGS. 1 and 2) is provided externally for positive ground connection.

Typical materials and dimensions for a specific embodiment of the invention include:

| Item | Approximate Dimensions or Characteristics | Material or Source |
| --- | --- | --- |
| Enclosure Main body 12 including | 8" × 8" × 6" | ASME SA 240 Type 304L, ⅛" thickness SS plate |
| Back wall 14 | 8" × 8" | Same |
| Sidewall 16 | 8" × 6" | " |
| Hood 22 | 8" × 8" × 2" | " |
| Cover Plate 30 | 8" × 8" | " |
| Cover Gasket 35 | 8" × 8" × ⅛" | Methylvinyl Siloxane |
| Opening 17 | 6" × 6" | — |
| Studs 31, 32, etc. (3 in each flange) | UNF-2A × ¾" | ASME SA 193 Grade B8, AISI Type 304 |
| Internally threaded nuts 33, 34, etc. | UNF-2B hex nuts | ASME SA 193 Grade B8, AISI Type 304 |
| Mounting housing 50 for glow plug | 1" Dia., 1" Length | Fabricated from ASME SA 479 Type 304S SS with machined surface 52 for matching with surface 54 |
| Glow plug 56 | Probe Temp. 1700° F. | AC Model 76, available from AC Division of General Motors, Detroit, MI |
| Electrical terminal box 26 with | 4¼" × 4¾" × 3" | AISI Type 304 14 ga SS |
| Lift off hinged and clamped cover 82 cover gasket | 4¼" × 4¾" | AISI Type 304 14 ga SS Methylvinyl Siloxane |
| Connector internal and external conduits 63 and 68 (unitary) | ¼" tube with ½ pipe thread | ASTM A-276 316 SS |
| Coupling collar 62 | 1" NPT coupling | ASTM A-182 316 SS |
| Retainer disk 70 | ⅞" OD × 11 ga with passage for 14 ga. wire 5/32" × 5/16" | ASME SA-240 Type 304L SS |
| Sealant 76 for hollow tubular conduit | | 3M Scotch Cast 9 available from 3M Minneapolis, MN |
| Transformer 93 200 VA step down 120 VAC 60 Hz with multiple secondary taps at 6,8,10,12,14,16 and 18 VAC | Stabilized output through range of LOC-A temperature range 3" × 4½" × 4¾" | Dongan Model 52-20-472Q available from Dongan Electric Co. Detroit, MI |

In the light of the above teachings, other configurations and materials than those specifically shown and described can be resorted to by those skilled in the art without departing from the inventive concepts; therefore, in determining the scope of the present invention reference should be made to the appended claims.

We claim:

1. In combination, gas ignitor and housing structure characterized by high-strength structural integrity and lightweight construction with hermetic sealing of a limited access enclosure to provide for reliable electrical operation of said ignitor over extended periods under adverse environmental conditions of pressure, temperature, nuclear radiation and moisture, said housing structure being adapted for surface mounting on a containment wall, such as a nuclear reactor containment structure, a unitary main body formed from stainless steel sheet metal free of internal and external structural bracing, said main body including a back wall, and sidewall means extending from the back wall so as to define an enclosure with a single open end spaced from said back wall, flange means extending in angled relationship from the sidewall means inwardly of said enclosure about the full periphery of the sidewall means circumscribing said open end to define an access opening in a plane spaced from and parallel to the back wall, said access opening having an area enabling hand placement of electrical transformer circuit elements and interconnection thereof, a plurality of studs extending outwardly in relation to said open-ended enclosure and predeterminedly distributed about the external surface of said flange means circumscribing said access opening, said studs being secured to the external surface of the flange means so as to preclude passage of gas therethrough, stud fastener means for coacting with and longitudinal movement along said studs, gasket means substantially coextensive dimensionally with said flange means, a unitary stainless steel sheet metal cover plate substantially coextensive dimensionally with said gasket means, said gasket means and cover plate defining apertures predeterminedly distributed contiguous to the periphery of said gasket means and cover plate, said apertures corresponding in location and number to the studs on said flange means enabling said gasket means and cover plate to overlay said flange means for closing the access opening at the open end of the enclosure, said apertures in said gasket means and cover plate having a cross-sectional dimension and configuration conforming to that of the studs so as to be in closely interfitted relationship providing only nominal clearance for assembly purposes when said gasket means and cover plate are placed over said access opening with a stud passing through each said aperture when said gasket means and cover plate means are in sealing relationship to said access opening, means contiguous to at least the distal end of each stud for receiving stud fastener means, said means providing for longitudinal movement of the stud fastener means laong the studs to uniformly apply sealing pressure through said cover plate to said gasket means securing the cover plate means with intermediate gasket means around the full periphery of the access opening providing a gas-tight hermetic seal of said access opening with the cover plate and sidewall means being interlocked so as to jointly absorb forces tending to configurationally distort either said cover plate or sidewall means, a glow plug having an ignitor glow probe, said cover plate including p1 a single sealable opening centrally located in said cover plate for passage and disposition of said probe externally of the enclosure, line voltage electrical conductors, a single sealable opening in the sidewall means of the main body for passage of the line voltage electrical conductors from externally of the enclosure to internally thereof, means for sealing said single opening in the cover plate about said probe, means for sealing said single opening in the sidewall means about said electrical conductors, and electrical transformer circuit means supported on an internal surface of said main body for connection to the line voltage electrical conductors internally of the enclosure to provide electrical power at a selected voltage level to said probe.

2. The combination of claim 1 in which said means for sealing such single opening in the cover plate about the ignitor glow probe comprise a stainless steel glow plug housing welded to the exterior surface of the cover plate in circumscribing relationship to the single opening in the cover plate, an elongated glow plug structure presenting said probe at one of its longitudinal ends, said glow plug housing defining means for receiving said glow plug structure and presenting an aperture for disposition of the ignitor electrode externally of the enclosure, said glow plug housing further defining an internal surface coaxial with said housing aperture for gas-tight sealing of said glow plug structure to said housing, the glow plug structure including an external peripheral surface for mating with said housing internal surface to provide a metal-to-metal seal, said glow plug housing and glow plug structure including coating thread means for moving the glow plug structure axially within said housing to dispose said probe externally of the enclosure and hermetically seal said single opening in the cover plate through said metal-to-metal mating surfaces.

3. The combination of claims 1 or 2 in which the means for sealing the single aperture in the sidewall means comprises a hollow tubular conduit extending through said single opening in the sidewall means to position a portion of said conduit internally and externally of said enclosure, collar means mounted on said conduit internally of the enclosure and welded to said conduit about the external periphery of said conduit means and to the interior surface of said sidewall means so as to circumscribe the single opening in the sidewall means sealing said opening against passage of gas externally of said conduit means into said enclosure, a retainer disk welded in gas-tight sealing relationship about its full periphery to the distal end of said conduit within the enclosure, said retainer disk being in transverse relationship to the longitudinal direction of said conduit sealing a major portion of the transverse area of said conduit while presenting a retainer aperture having a configuration and size limited to that required to permit passage of said line voltage electrical conductors, said line-voltage electrical conductors extending through said hollow conduit to the interior of the enclosure from externally thereof in a manner to provide a service loop within said conduit, and a hardenable sealant filling remaining space of the hollow tubular conduit about said line voltage electrical conductors between said retaining disk at its interior distal end and the exterior distal end of the hollow tubular conduit.

4. The combination of claim 1 further including hood means secured to an exterior surface of said main body and disposed above said ignitor probe to provide liquid spray protection thereof.

5. The combination of claim 3 further including an electrical terminal box secured to an exterior surface of said main body surrounding said exterior portion of the hollow tubular conduit to provide for electrical connection of supply voltage to said line-voltage electrical conductors externally of the main body enclosure.

6. The combination of claim 3 further including means secured to an exterior portion of the main body contiguous to its back wall to provide for surface mounting of the enclosure on a containment wall.

* * * * *